(12) United States Patent
Oh et al.

(10) Patent No.: US 9,870,394 B2
(45) Date of Patent: Jan. 16, 2018

(54) QUERY ROUTING METHOD, QUERY ROUTING SERVER PERFORMING THE SAME AND STORAGE MEDIUM STORING THE SAME

(71) Applicant: LG CNS CO., LTD., Seoul (KR)

(72) Inventors: Seokkeun Oh, Seoul (KR); Hyunsang Kang, Seoul (KR); Jongwon Park, Seoul (KR); Jooyoul Lee, Seoul (KR); Donjung Choi, Seoul (KR)

(73) Assignee: LG CNS CO., LTD., Seoul (KR)

( * ) Notice: Subject to any disclaimer, the term of this patent is extended or adjusted under 35 U.S.C. 154(b) by 440 days.

(21) Appl. No.: 14/564,961

(22) Filed: Dec. 9, 2014

(65) Prior Publication Data

US 2016/0162546 A1 Jun. 9, 2016

(51) Int. Cl.
*G06F 17/30* (2006.01)

(52) U.S. Cl.
CPC .. *G06F 17/30442* (2013.01); *G06F 17/30463* (2013.01)

(58) Field of Classification Search
CPC .................................. G06F 17/30442
See application file for complete search history.

(56) References Cited

U.S. PATENT DOCUMENTS

| 2004/0174823 A1* | 9/2004 | Steele | H04L 12/2602 370/252 |
| 2012/0059839 A1* | 3/2012 | Andrade | G06F 17/3056 707/760 |

FOREIGN PATENT DOCUMENTS

| KR | 10-2012-0073229 A | 7/2012 |
| KR | 10-1374651 B1 | 3/2014 |

OTHER PUBLICATIONS

Hasan, Waqar. Optimization of SQL queries for parallel machines. Diss. Stanford University, 1996.*
Olson, Impala v Hive, Dec. 22, 2013, accessed Jul. 5, 2017 at https://vision.cloudera.com/impala-v-hive/.*
Bethke, War of the Hadoop SQL aengines. And the winner is . . . ?, Jul. 15, 2014, accessed Jul. 5, 2017 at https://sonra.io/2014/07/15/war-of-the-hadoop-sql-engines-and-the-winner-is/.*

* cited by examiner

*Primary Examiner* — William Spieler
(74) *Attorney, Agent, or Firm* — KED & Associates, LLP

(57) ABSTRACT

Provided is a method, server, and storage medium for query routing. A query may be processed on a query routing server using a same distributed file system and connectable with a plurality of query performance engines sharing metadata. The method may include receiving, through a user input interface, a query and a criterion to select a query performance engine among a plurality of query performance engines, and determining, by a query routing server, one of the plurality of query performance engines based on the received criterion.

18 Claims, 4 Drawing Sheets

QUERY ROUTING METHOD, QUERY ROUTING SERVER PERFORMING THE SAME AND STORAGE MEDIUM STORING THE SAME

BACKGROUND

1. Field

Embodiments may relate to a query routing technology and more particularly to a query routing method, a query routing server performing the same and storage medium for the same determining a most suitable query performance engine based on at least one of a query performance engine selected by a user, a query characteristic and a load of the query performance engine to perform the query.

2. Background

Methods, servers and storage medium for query routing are known, however, they suffer from various disadvantages.

BRIEF DESCRIPTION OF THE DRAWINGS

The embodiments will be described in detail with reference to the following drawings in which like reference numerals refer to like elements wherein.

DETAILED DESCRIPTION

Figure 1:
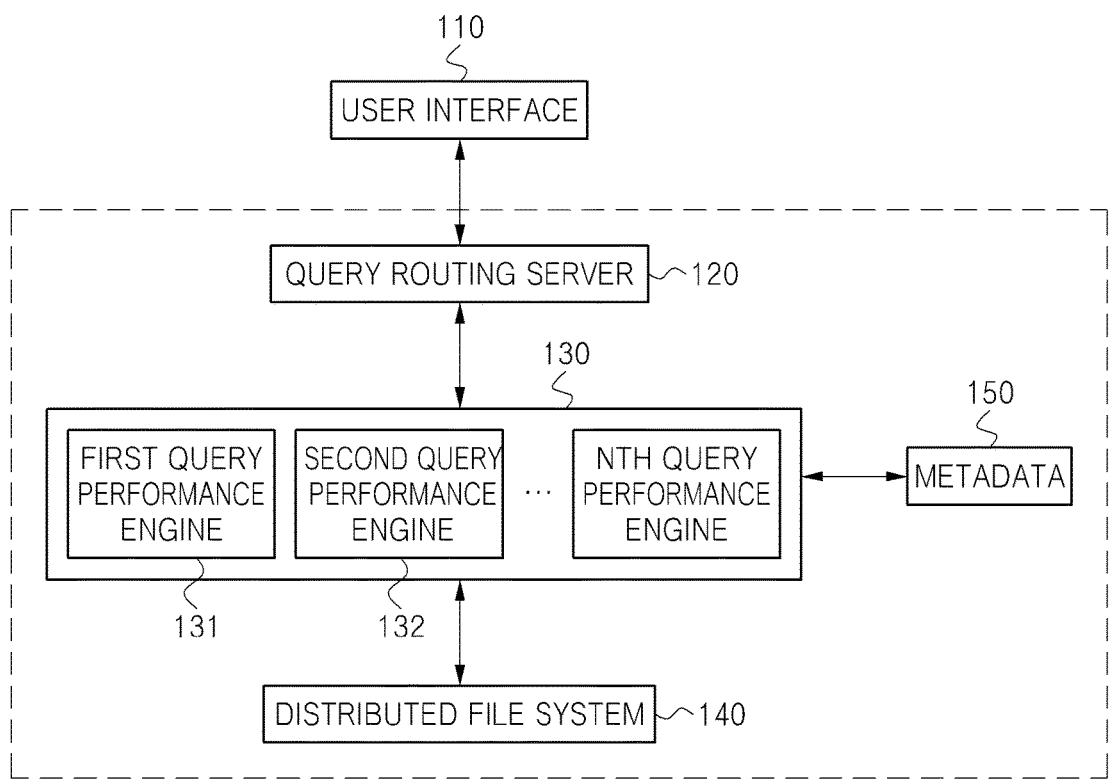
FIG. 1 is a block diagram of a query routing system.

Explanation of the present invention is merely an embodiment for structural or functional explanation, so the scope of the present invention should not be construed to be limited to the embodiments explained in the embodiment. That is, since the embodiments may be implemented in several forms without departing from the characteristics thereof, it should also be understood that the described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

Terms described in the present disclosure may be understood as follows.

While terms such as "first" and "second," etc., may be used to describe various components, such components must not be understood as being limited to the above terms. The above terms are used to distinguish one component from another. For example, a first component may be referred to as a second component without departing from the scope of rights of the present invention, and likewise a second component may be referred to as a first component.

It will be understood that when an element is referred to as being "connected to" another element, it can be directly connected to the other element or intervening elements may also be present. In contrast, when an element is referred to as being "directly connected to" another element, no intervening elements are present. In addition, unless explicitly described to the contrary, the word "comprise" and variations such as "comprises" or "comprising," will be understood to imply the inclusion of stated elements but not the exclusion of any other elements. Meanwhile, other expressions describing relationships between components such as "between", "immediately between" or "adjacent to" and "directly adjacent to" may be construed similarly.

Singular forms "a", "an" and "the" in the present disclosure are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Identification letters (e.g., a, b, c, etc.) in respective steps or operations are used for the sake of explanation and do not describe any particular order. The respective operations may be changed from a mentioned order unless specifically mentioned in context. Namely, respective steps may be performed in the same order as described, may be substantially simultaneously performed, or may be performed in reverse order.

The present invention may be implemented as machine-readable codes on a machine-readable medium. The machine-readable medium includes any type of recording device for storing machine-readable data. Examples of the machine-readable recording medium include a read-only memory (ROM), a random access memory (RAM), a compact disk-read only memory (CD-ROM), a magnetic tape, a floppy disk, and optical data storage. The medium may also be carrier waves (e.g., Internet transmission). The computer-readable recording medium may be distributed among networked machine systems which store and execute machine-readable codes in a de-centralized manner.

The terms used in the present application are merely used to describe particular embodiments, and are not intended to limit the present invention. Unless otherwise defined, all terms used herein, including technical or scientific terms, have the same meanings as those generally understood by those with ordinary knowledge in the field of art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined in the present application.

An OLAP (OnLine Analytical Processing) is a procedure that a last user directly access to multi-dimensional information to interactively analyze information and to utilize for a decision making. In general, in a big data environment, a query engine stores a data file in Hadoop, uses SQL (Structured Query language) of the stored data, executes a query on a distributed environment to return a result. A typical query performance engine (also referred to as a query engine or query execution engine) may correspond to Tajo, Hive, Impala, Presto and the like.

A method and system may classify a result being returned by a search engine applying a feedback from a user for improving the search result. This technology may determine a formula calculating a relation score for a document and a search query to classify the document based on the relation score.

Moreover, a trusted query system and method may include providing a search interface causing a user to query a structured database, searching for database entries from at least one database, flattening a plurality of database entries, indexing the plurality of flattened database entries to form a search engine index and prompting the user for inputting an input.

As broadly described and embodied herein, a query routing method is provided for selecting a query performance engine most suitable for a corresponding query according to at least one of a characteristic of a query and a load of a query performance engine to perform the query. The query routing method may increase the efficiency of query performance as the query may be processed through a query performance engine most suitable for a certain query characteristic.

The query routing method may also enable connecting with a plurality of query performance engines to address the inconvenience in separately using the plurality of query performance engines. Moreover, the query routing method of the present disclosure may allow receiving a user's selection for at least one of a plurality of query performance engines to perform a query to improve functionality and convenience.

FIG. 1 is a block diagram of a query routing system. The query routing system 100 may include a user interface 110, a query routing server 120, a plurality of query performance engines 130, a distributed file system 140 and metadata 150. The plurality of query performance engines 130 may use the same distributed file system 140 and share the same metadata 150.

The user interface 110 may allow a user to input a query to the query routing server 120 and may output a query performance result obtained through the query routing server 120. Herein, the query is a query language and corresponds to a computer language being used to obtain specific information among many data files. In an embodiment, the user may input the query through the user interface 110 according to a format predefined in the query routing server 120 or input the query independent of a specific format. The user interface 110 may display the query performance result to enable the user to view the query performance result.

The query routing server 120 may correspond to a computing device which may obtain a result for a corresponding query based on a query received from the user interface 110 to provide the result to the user interface 110. In an embodiment, the query routing server 120 may determine a most suitable query performance engine based on at least one of a characteristic of the query received from the user interface 110 or load of each of the plurality of query performance engines 130, and may perform the query through a corresponding query performance engine. In another embodiment, the query routing server 120 may perform the query through a specific query performance engine when the query routing server 120 receives the query together with a selection of a specific query performance engine through the user interface 110.

The plurality of query performance engines 130 may each have a different efficiency according to a query characteristic and may have a different characteristic in terms of an amount of data, a processing speed or stability. For example, the plurality of query performance engines 130 may correspond to Tajo, Hive, Impala or Presto. In an embodiment, the plurality of query performance engines 130 may share the same distributed file system 140 and same metadata 150.

The distributed file system 140 may store and manages a data file corresponding to an object performing the query. In an embodiment, the distributed file system 140 may process the query in parallel. In an embodiment, a Hadoop distributed file system (HDFS) may be used as the distributed file system 140.

The metadata 150 is a schema for actual data stored in the distributed file system 140 and may correspond to data that defines the actual data. In an embodiment, the metadata 150 may correspond to data standardizing and may define a data format being used in each of the plurality of query performance engines 130. The plurality of query performance engines 130 may utilize the metadata to obtain the query result from the distributed file system 140.

Figure 2:
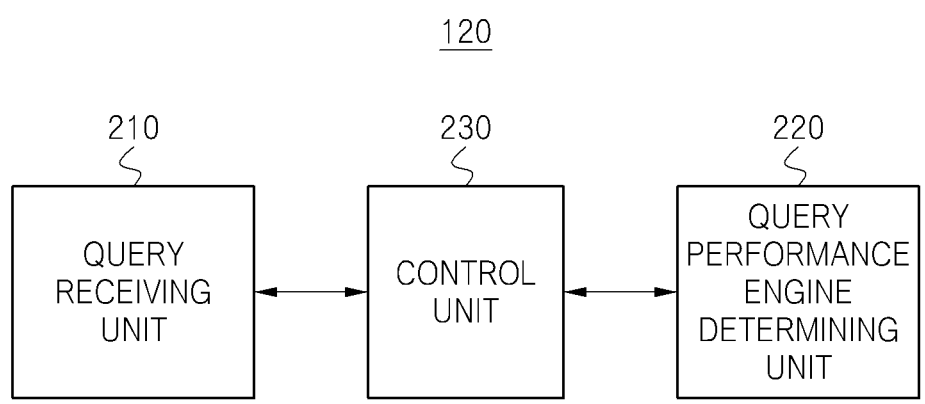
FIG. 2 is a block diagram of a query routing server in FIG. 1.

FIG. 2 is a block diagram of a query routing server in FIG. 1. The query routing server 120 may include a query and criterion receiving unit 210, a query performance engine determining unit 220 and a control unit 230. The query and criterion receiving unit 210 may receive a query and a query performance engine determining criterion from the user through the user interface 110. Here, the query performance engine determining criterion may correspond to a criterion to select at least one query performance engine for performing the query among the plurality of query performance engines 130.

For example, the query performance engine determining criterion may be determined by the user directly determining a specific query performance engine through input of corresponding information. Alternatively, the criterion may be determined according to a query type, a load of the query performance engine or a query characteristic and the load of the query performance engine. In an embodiment, the query and criterion receiving unit 210 may receive a query most suitable for a predefined format or may receive a query inputted by the user independent of the predefined format and changed to a format that is usable on the query routing server 120.

The query performance engine determining unit 220 may determine at least one of the plurality of query performance engines 130 based on the query performance engine determining criterion received through the query and criterion receiving unit 210.

The query performance engine determining unit 220 may check whether there is the query performance engine predetermined by the user based on the received query performance engine determining criterion. The user may determine a specific query performance engine to perform the query inputted through the user interface 110 and the query performance engine determining unit 220 may determine a corresponding query performance engine based on the selection or designation by the user.

The query performance engine determining unit 220 may check a load on the query performance engine predetermined by the user. The query performance engine determining unit 220 may then change the predetermined query performance engine to another query performance engine when the load exceeds a specific criterion. Herein, the load for the query performance engine may correspond to a load level for the query performance engine and may be determined based on a number of jobs being performed by the query performance engine, a number of jobs on standby and a number of a work node. When the load of the query performance engine predetermined by the user exceeds the specific criterion and the query performance engine should be changed to another query performance engine, the query performance engine determining unit 220 may determine the new query performance engine based on at least one of a query characteristic, a load of each of the plurality of query performance engines 130 or a value calculated by assigning a weight to the query characteristic and the load.

When a query performance engine is not designated by the user, the query performance engine determining unit 220 may determine a characteristic of the query received through the query and criterion receiving unit 210. Here, the query characteristic may be determined based on at least one of a table or a conditional clause associated with the query. For example, the query performance engine determining unit 220 may be determined based on at least one of a number of a reference table, a number of total data, whether an overload calculation (e.g., Jon, Sort or Grouping) is used or the conditional clause.

The query performance engine determining unit 220 may determine the query characteristic based on a criterion predetermined by the user. For example, the query performance engine determining unit 220 may determine the query characteristic according to a criterion predetermined by the user such as {query characteristic 1: number of data <=k1 (predetermined criterion for number of data)}, {query characteristic 2: number of data >k1, number of reference table >k2 (predetermined criterion for number of reference table)}, {query characteristic 3: ratio of aggregation, calculation, sign, alignment operation in total calculation >k3 (predetermined criterion for ratio of specific calculation in total calculation)}. Here, the query characteristic 1 may correspond to a value where the number of data is less than a specific value (k1). The query characteristic 2 may correspond to a value where the number of data exceeds a specific value (k1) and the number of reference tables exceeds a specific value (k2). The query characteristic 3 may correspond to a value where a ratio of the aggregation, calculation, sign, alignment operation in the total calculation exceeds a specific value (k3).

The query performance engine determining unit 220 may determine the query characteristic based on a query execution plan (QEP). Here, the query execution plan may correspond to a plan for performing the query in a most optimized way. For example, the query execution plan may correspond to an order in accessing data for performing the query, an order of calculation of a plurality of operators, information for operators for parallel processing among the plurality of operators or information for applicable operators instead of a specific operator in a specific case. Also, an operator of the query received through the query and criterion receiving unit 210 may be changed in a query optimization procedure through the query execution plan but the query performance results may be the same.

The query performance engine determining unit 220 may determine one of the plurality of query performance engines 130 based on the query characteristic. The query performance engine determining unit 220 may detect a query type to determine a most optimized query performance engine among the plurality of query performance engines 130. Here, the query type may be determined based on the query execution plan including information performing the query in a most optimized way. For example, when a plurality of operators included in a specific query are suitable for parallel processing, the query performance engine determining unit 220 may refer to the query execution plan to determine a query performance engine for parallel processing the plurality of operators. In another embodiment, when one of the plurality of operators included in the specific query may be changed to another replaceable operator, the query performance engine determining unit 220 may apply the query execution plan to determine a query performance engine most suitable for performing a certain operator.

The query performance engine determining unit 220 may check a load for the query performance engine is determined based on the query type to change the determined query performance engine to another query performance engine when the load exceeds a specific criterion. When the load of the query performance engine is determined based on the query execution plan, the query performance engine determining unit 220 may determine the new query performance engine based on at least one of the query characteristic, the load for each of the plurality of query performance engines 130 or a value calculated by assigning a weight to the query characteristic and the load.

The query performance engine determining unit 220 may determine one of the plurality of query performance engines 130 based on the loads for the plurality of query performance engines 130 when a query performance engine is not predetermined by the user. For example, the query performance engine determining unit 220 may select a query performance engine having the lowest load among the plurality of query performance engines 130.

When the query performance engine is not predetermined by the user, the query performance engine determining unit 220 may select one of the plurality of query performance engines 130 based on a value calculated by assigning a specific weight to each of the query characteristic and the load for each of the plurality of query performance engines 130.

The query performance engine determining unit 220 may calculate a score for suitability of each of the plurality of query performance engines 130 based on a characteristic of the received query and may calculate a score for the load for each of the plurality of query performance engines 130. For example, a score of the query performance suitability for each of the plurality of query performance engines 130 may be relatively higher when performance characteristic of a corresponding query performance engine for a specific query is more suitable. Also, a score of the load for each of the plurality of query performance engines 130 may be relatively higher when a load of a corresponding query performance engine is lower.

For example, when a first query performance engine 131 is more suitable than a second query performance engine 132 based on a characteristic for a query A received form the user, a suitability for the first query performance engine 131 may be calculated as 90 and a suitability for the second query performance engine 132 may be calculated as 75. Also, when a load of the first query performance engine 131 is greater than that of the second query performance engine 132, the load of the first query performance engine 131 may be calculated as 65 and that of the second query performance engine 132 may be calculated as 80. Herein, a score for the suitability and the load of the query performance according to the query characteristic may be calculated by various way.

The query performance engine determining unit 220 may assign a weight to each of the query performance suitability and the load to calculate the score for each of the plurality of query performance engines 130. Here, the weight may be determined by the user based on the query performance suitability score calculated based on the query characteristic and the load score calculated based on the load for the query performance engine. For example, when a weight of 70% is set to the query performance suitability score, a weight of 30% may be set to the load score. In the previous example, each of the query performance suitability score and the load score for the first query performance engine 131 is (90, 65) and each of the query performance suitability score and the load score for the second query performance engine 132 is (75, 80). Here, a weighted score for the first query performance engine 131 may be calculated as 90*0.7+

65*0.3=82.5 and weighted a score for the second query performance engine 132 may be calculated as 65*0.7+80*0.3=69.5. The query performance engine determining unit 220 may determine a query performance engine having a high score based on this calculated score for each of query performance engine, and hence, the query performance engine determining unit 220 may select the first query performance engine 131 in the above example.

When there is a specific criterion for selecting a query performance engine selected by the user, the query performance engine determining unit 220 may determine the query performance engine based on the corresponding criterion. For example, when only a query characteristic is selected as a criterion determining the query performance engine by the user, the query performance engine determining unit 220 may determine a query performance engine most suitable to a characteristic of a corresponding query based on the selected query characteristic, regardless of a load of the query performance engine. In another embodiment, when a specific criterion is not selected by the user, the query performance engine determining unit 220 may determine the query performance engine based on at least one of the query characteristic or a value calculated by assigning a weight to each of the query characteristic and the load.

In an embodiment, the query routing server 120 may further include a query transmitting unit. The query transmitting unit may transmit the query to the query performance engine determined through the query performance engine determining unit 220. Moreover, the control unit 230 may control an operation and data flow of the query and criterion receiving unit 210 and the query performance engine determining unit 220.

Figure 3:
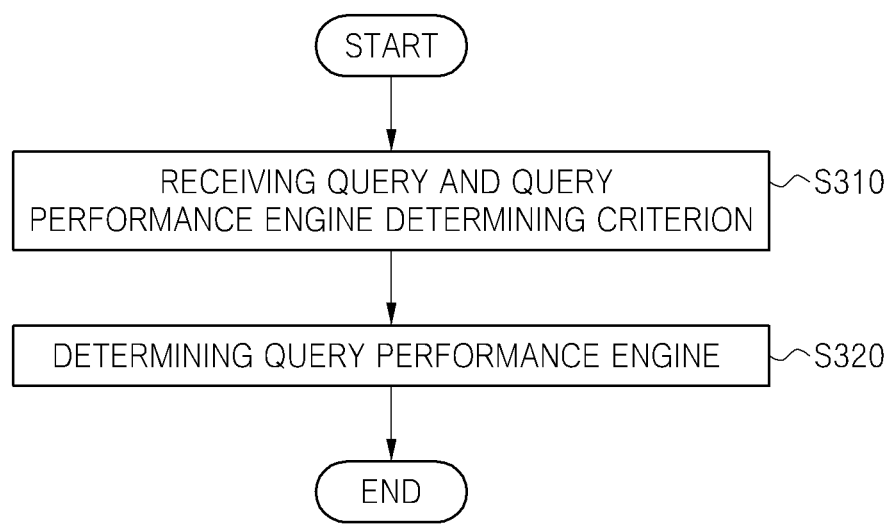
FIG. 3 is a flow chart for a query routing method being performed on a query routing system.

FIG. 3 is a flow chart for a query routing method being performed on a query routing system. The query and criterion receiving unit 210 receives the query and the query performance engine determining criterion from the user through the user interface 110, Step S310. In an embodiment, the query received from the user may be formed with various type.

The query performance engine determining unit 220 may determine at least one of the plurality of query performance engines 130 based on the query performance engine determining criterion received through the query and criterion receiving unit 210, Step S320. In an embodiment, the query performance engine determining unit 220 may determine a corresponding query performance engine when there is a query performance engine predetermined by the user, and the query performance engine determining unit 220 may determine the query performance engine based on the query characteristic, the query type or the load of the query performance engine when there is no query performance engine predetermined by the user. Herein, the query characteristic may be determined based on at least one of the number of the data, the number of the reference table, whether the specific calculation is used or the conditional clause, and the query type may be determined based on the query execution plan.

In an embodiment, the query performance engine determining unit 220 may determine the query performance engine based on the query type inputted by the user. For example, when a query performed through the first query performance engine 131 among the plurality of query performance engines 130 is predetermined for a query being inputted with a first type A from the user and a query performed through the second query performance engine 132 is predetermined for a query being inputted with a second type B from the user, the query performance engine determining unit 220 may select the query performance engine 131 based on the identified type.

Figure 4:
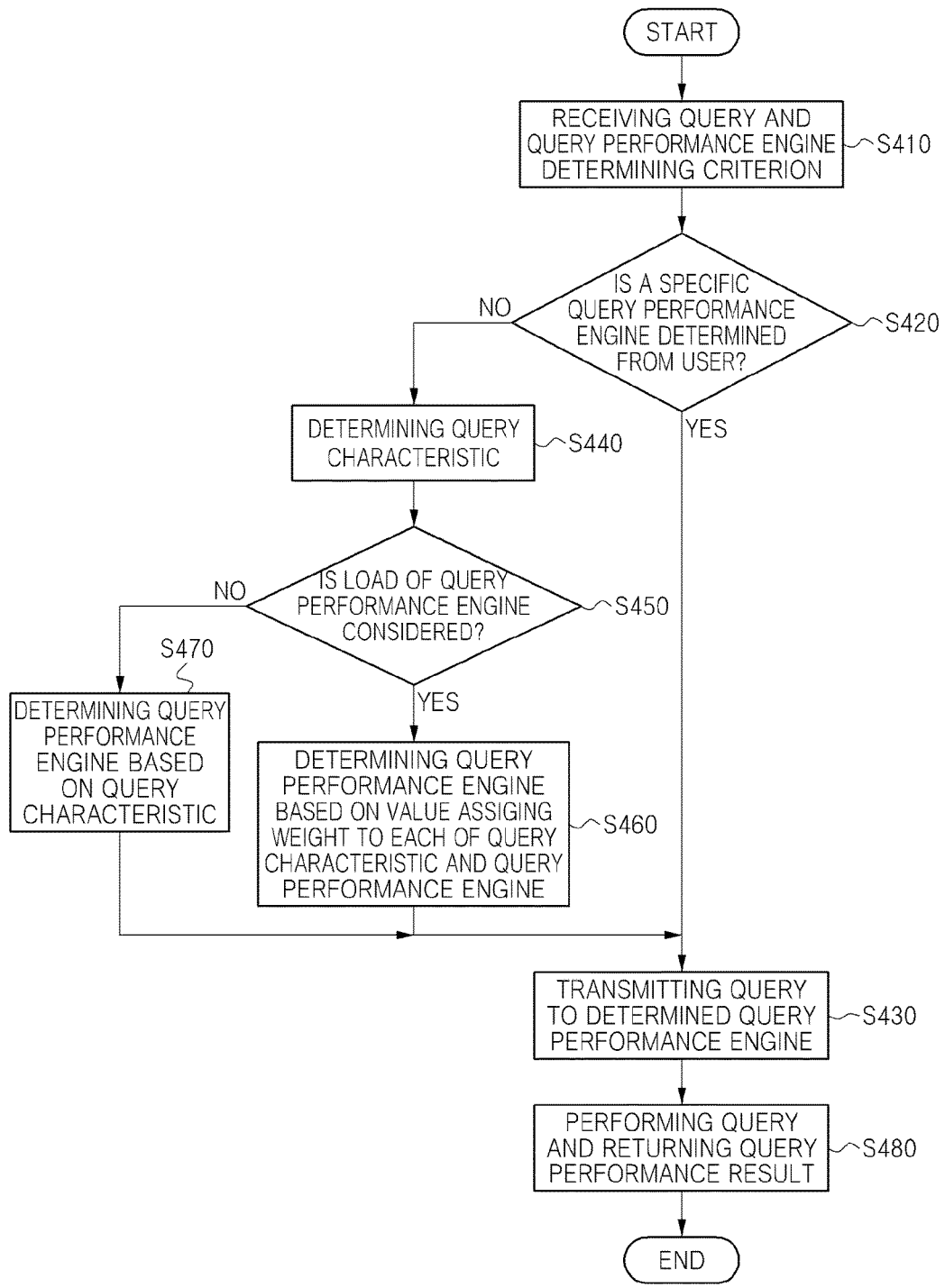
FIG. 4 is a detailed flow chart for a query routing method of FIG. 3.

FIG. 4 is a detailed flow chart for a query routing method of FIG. 3. The query and criterion receiving unit 210 may receive the query and the query performance engine determining criterion from the user, Step S410, and the query performance engine determining unit 220 may check whether there is a query performance engine selected by the user, Step S420.

The user may select a specific query performance engine with a query input, and the query may be transmitted through the query transmitting unit to the query performance engine selected by the user, Step S430. In an embodiment, when there is a query performance engine determined by the user and the load of a corresponding query performance engine exceeds a specific criterion predetermined by the user, the query performance engine determining unit 220 may change the query performance engine to another query performance engine.

When a query performance engine is not determined by the user, the query performance engine determining unit 220 may determine the query characteristic, Step S440, and may check whether the load of the query performance engine should be considered, Step S450. A criterion for determining the query performance engine may be set by the use. For example, when the user sets to determine the query performance engine based on only the load of the query performance engine, the query performance engine determining unit 220 may consider the load of each of the plurality of query performance engines 130 without determining the query characteristic to determine the query performance engine.

When the query performance engine determining unit 220 considers the load of the query performance engine, the query performance engine determining unit 220 may determine the query performance engine based on the value calculated by assigning a weight to each of the values for the query characteristic and the load of the query performance engine, Step S460.

When the query performance engine determining unit 220 does not consider the load of the query performance engine, the query performance engine determining unit 220 may determine the query performance engine based on the query characteristic determined on Step S440, Step S470.

The plurality of query performance engines 130 may be Impala, Tajo, Hive or another appropriate type of query engine. For example, when the query characteristic determined through the query performance engine determining unit 220 specifies that the number of data be less than a specific criterion, the query performance engine determining unit 220 may select the Impala using an in-memory structure as the query performance engine.

For another example, when the query characteristic determined through the query performance engine determining unit 220 specifies that the number of data exceeds a specific criterion, the number of reference table exceeds a specific criterion and a ratio of the aggregation, calculation, sign, alignment operation in total calculation exceeds a specific ratio, the query performance engine determining unit 220 may select the Tajo as the query performance engine. In another case, the query performance engine determining unit 220 may determine the Hive as the query performance engine.

The query transmitting unit may transmit the query to the query performance engine determined through the query performance engine determining unit 220, Step S430. The query performance engine receiving the query may perform a corresponding query and transmits the query performance result to the query routing server 120, Step S480, and the query routing server 120 may provide the received query performance result to the user interface 110.

As broadly described and embodied herein, a query routing method is provided for selecting a query performance engine most suitable for a corresponding query according to at least one of a characteristic of a query and a load of a query performance engine to perform the query. The query routing method may increase the efficiency of query performance as the query may be processed through a query performance engine most suitable for a certain query characteristic.

The query routing method may also enable connecting with a plurality of query performance engines to resolve an inconvenience in separately using the plurality of query performance engines. Moreover, the query routing method of the present disclosure may allow receiving a user's selection for at least one of a plurality of query performance engines to perform a query.

In at least one embodiment, a query routing method may be performed on a query routing server using a same distributed file system and may be connectable with a plurality of query performance engines sharing metadata. The method may include receiving a query and a query performance engine determining criterion from a user and determining one of the plurality of query performance engines based on the query performance engine determining criterion.

In at least one embodiment, determining one of the plurality of query performance engines may include checking whether there is a query performance engine predetermined by the user based on the query performance engine determining criterion.

In at least one embodiment, determining one of the plurality of query performance engines may include checking a load for a corresponding query performance engine when there is the query performance engine to change the query performance engine to another query performance engine when the load exceeds a specific criterion.

In at least one embodiment, determining one of the plurality of query performance engines may include determining a characteristic of the query based on at least one of a table and a conditional clause associated with the received query when there is not the query performance engine.

In at least one embodiment, determining one of the plurality of query performance engines may include detecting a type of the received query to determine a query performance engine most optimized to the query type among the plurality of query performance engines.

In at least one embodiment, the query type may be determined based on a query execution plan (QEP), the query execution plan (QEP) including information for whether an operator included in the query is parallel processibe or whether there is another applicable operator instead of the operator for performing the query in an most optimized way.

In at least one embodiment, determining one of the plurality of query performance engines may include check a load for the determined query performance engine to change the determined query performance engine to another query performance engine when the load exceeds the specific criterion.

In at least one embodiment, determining one of the plurality of query performance engines may include determining one of the plurality of query performance engines based on loads of the plurality of query performance engines when there is not the query performance engine.

In at least one embodiment, determining one of the plurality of query performance engines may include determining a characteristic of the query when there is not the query performance engine to determine one of the plurality of query performance engine based on a value calculated by assigning a specific weight to each of the loads for the plurality of query performance engines.

In at least one embodiment, the method may further include transmitting the query to the determined query performance engine.

In at least one embodiment, a query routing server using a same distributed file system and being connectable with a plurality of query performance engines sharing metadata may include a query and criterion receiving unit receiving a query and a query performance engine determining criterion from a user and a query performance engine determining unit determining one of the plurality of query performance engines based on the query performance engine determining criterion.

In at least one embodiment, the query performance engine determining unit may check whether there is the query performance engine predetermined by the user based on the query performance engine determining criterion.

In at least one embodiment, the query performance engine determining unit may check a load for a corresponding query performance engine when there is the query performance engine to change the query performance engine to another query performance engine when the load exceeds a specific criterion.

In at least one embodiment, the query performance engine determining unit may determine a characteristic of the query based on at least one of a table and a conditional clause associated with the received query when there is not the query performance engine.

In at least one embodiment, the query performance engine determining unit may determine one of the plurality of query performance engine based on loads for the plurality of query performance engines when there is not the query performance engine.

In at least one embodiment, the query performance engine determining unit may determine a characteristic of the query when there is not the query performance engine to determine one of the plurality of query performance engine based on a value calculated by assigning a specific weight to each of the loads for the plurality of query performance engines.

In at least one embodiment, the server may further include a query transmitting unit transmitting the query to determined query performance engine.

In at least one embodiment, a machine-readable non-transitory medium storing a computer program for a query routing method, the method being performed on a query routing server using a same distributed file system and being connectable with a plurality of query performance engines sharing metadata, the machine-readable non-transitory medium having stored thereon machine-executable instructions for receiving a query and a query performance engine determining criterion from a user and determining one of the plurality of query performance engines based on the query performance engine determining criterion.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for routing a query performed on a query routing server using a same distributed file system and being connectable with a plurality of query performance engines sharing metadata, the plurality of query performance engines includes a first query performance engine and a second query performance engine which are different types of query performance engines, the method comprising:
   receiving, through a user input interface, a query and a criterion to select a query performance engine among a plurality of query performance engines; and
   determining, by a query routing server, one of the plurality of query performance engines based on the received criterion,
   wherein determining one of the plurality of query performance engines includes detecting a type of the received query to determine a query performance engine between the first query performance engine or the second query performance engine that is most optimized for the query type among the plurality of query performance engines, and
   wherein the query type is determined based on a query execution plan (QEP), the QEP including information for whether an operator included in the query is configured for parallel processing or whether there is another applicable operator more suitable for performing the query to replace the operator included in the query.

2. The method of claim 1, wherein determining one of the plurality of query performance engines includes checking whether a query performance engine is predetermined by a user based on the received criterion to select a query performance engine.

3. The method of claim 2, wherein determining one of the plurality of query performance engines includes checking a load on at least one query performance engine to change the determined query performance engine to another query performance engine when the load exceeds a prescribed level.

4. The method of claim 3, wherein determining one of the plurality of query performance engines includes determining a characteristic of the query based on at least one of a table or a conditional clause associated with the received query.

5. The method of claim 2, wherein determining one of the plurality of query performance engines includes checking a load on the predetermined query performance engine to change the predetermined query performance engine to another query performance engine when the load exceeds a prescribed level.

6. The method of claim 2, wherein determining one of the plurality of query performance engines includes determining one of the plurality of query performance engines based on loads of the plurality of query performance engines when a query performance engine is not predetermined.

7. The method of claim 2, wherein determining one of the plurality of query performance engines includes determining a characteristic of the query when a query performance engine is not predetermined and determining one of the plurality of query performance engines based on a value calculated by assigning a prescribed weight to a load on each of the plurality of query performance engines.

8. The method of claim 1, wherein determining one of the plurality of query performance engines includes checking a load on the determined query performance engine to change the determined query performance engine to another query performance engine when the load exceeds a prescribed level.

9. The method of claim 1, further comprising:
   transmitting the query to the determined query performance engine.

10. A query routing server using a same distributed file system and being connectable with a plurality of query performance engines sharing metadata, the server comprising:
    at least one processor;
    at least one memory;
    a user interface;
    a query and criterion receiving unit that receives, through the user interface, a query and a criterion to select a query performance engine among a plurality of query performance engines, the plurality of query performance engines includes a first query performance engine and a second query performance engine which are different types of query performance engines; and
    a query performance engine determining unit that determines one of the plurality of query performance engines based on the received criterion,
    wherein determining one of the plurality of query performance engines includes detecting a type of the received query to determine a query performance engine between the first query performance engine or the second query performance engine that is most optimized for the query type among the plurality of query performance engines, and
    wherein the query type is determined based on a query execution plan (QEP), the QEP including information for whether an operator included in the query is configured for parallel processing or whether there is another applicable operator more suitable for performing the query to replace the operator included in the query.

11. The server of claim 10, wherein the query performance engine determining unit checks whether a query performance engine is predetermined by a user based on the received criterion.

12. The server of claim 11, wherein the query performance engine determining unit checks a load on at least one query performance engine to change the determined query performance engine to another query performance engine when the load exceeds a prescribed level.

13. The server of claim 11, wherein the query performance engine determining unit checks a load on the predetermined query performance engine to change the predetermined query performance engine to another query performance engine when the load exceeds a prescribed level.

14. The server of claim 11, wherein the query performance engine determining unit determines a characteristic of the query based on at least one of a table or a conditional clause associated with the received query when a query performance engine is not predetermined.

15. The server of claim 11, wherein the query performance engine determining unit determines one of the plurality of query performance engine based on loads on the plurality of query performance engines when a query performance engine is not predetermined.

16. The server of claim 11, wherein the query performance engine determining unit determines a characteristic of the query when a query performance engine is not predetermined to select one of the plurality of query performance engines based on a value calculated by assigning a prescribed weight to a load on each of the plurality of query performance engines.

17. The server of claim 10, further comprising:
a query transmitting unit that transmits the query to the determined query performance engine.

18. A machine-readable non-transitory medium storing a computer program for a query routing method, the method being performed on a query routing server using a same distributed file system and being connectable with a plurality of query performance engines sharing metadata, wherein the plurality of query performance engines includes a first query performance engine and a second query performance engine which are different types of query performance engines, the machine-readable non-transitory medium having stored thereon machine-executable instructions for:
receiving a query and a criterion to select a query performance engine among a plurality of query performance engines; and
determining one of the plurality of query performance engines based on the received criterion,
wherein determining one of the plurality of query performance engines includes detecting a type of the received query to determine a query performance engine between the first query performance engine or the second query performance engine that is most optimized for the query type among the plurality of query performance engines, and
wherein the query type is determined based on a query execution plan (QEP), the QEP including information for whether an operator included in the query is configured for parallel processing or whether there is another applicable operator more suitable for performing the query to replace the operator included in the query.

* * * * *